June 30, 1964 F. L. CHRISTENSEN 3,138,875
DIAMOND SCRIBER
Filed Sept. 11, 1961 2 Sheets-Sheet 1
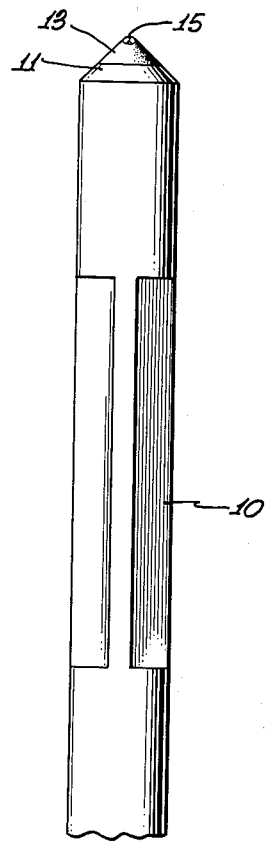
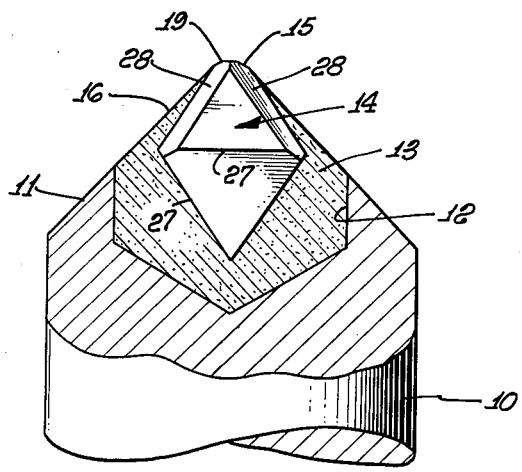
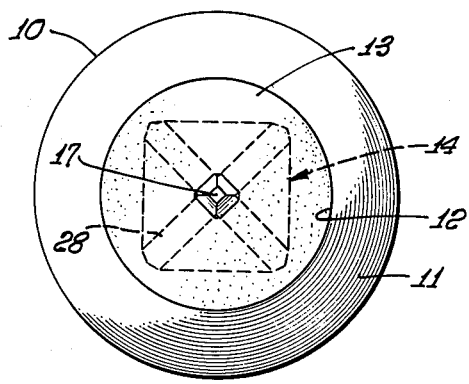
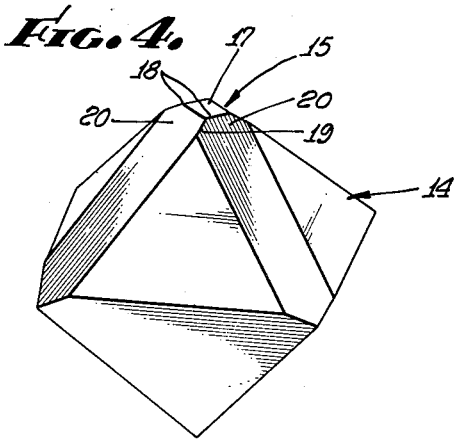
INVENTOR.
FRANK L. CHRISTENSEN
BY
Bernard Kriegel
ATTORNEY.

June 30, 1964  F. L. CHRISTENSEN  3,138,875
DIAMOND SCRIBER
Filed Sept. 11, 1961  2 Sheets-Sheet 2

INVENTOR.
FRANK L. CHRISTENSEN
BY
Bernard Kriegel
ATTORNEY.

United States Patent Office 3,138,875
Patented June 30, 1964

3,138,875
DIAMOND SCRIBER
Frank L. Christensen, Palo Alto, Calif., assignor to Tempress Research Co., Inc., Sunnyvale, Calif., a corporation of California
Filed Sept. 11, 1961, Ser. No. 137,134
7 Claims. (Cl. 33—18)

The present invention relates to scribers, and more particularly to scribers embodying diamonds as the essential scribing elements.

Diamond scribers have heretofore been provided with a single point, by means of which the scribing function has been performed. When this point becomes dull or breaks off, the utility of the scriber is at an end. Moreover, the point has been provided where it normally exists in a natural diamond polyhedron, such as a diamond of octahedron shape, which is the softest region in the diamond crystal. As a result, the life of the point is relatively curtailed.

Accordingly, an object of the present invention is to provide a diamond scriber in which the diamond crystal is provided with a multiplicity of scribing points, a new sharp point being available whenever a previously used point has become dulled. As a result, a single diamond will have an effective scribing life which is many times the life of a diamond scriber having a single scribing point.

Another object of the invention is to provide a diamond scriber in which the diamond crystal is provided with a multiplicity of scribing points, each point being comparatively stronger and possessing a longer useful life than heretofore available.

A further object of the invention is to provide a diamond scriber embodying a diamond having a plurality of scribing points formed in a harder portion of the diamond crystal than the point of a natural polyhedron, such as an octahedron.

An additional object of the invention is to provide a diamond scriber in which the diamond is in the form of a truncated pyramid to provide a plurality of diamond scribing points or edges.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of a diamond scriber;

FIG. 2 is an enlarged longitudinal section, parts being shown in side elevation, of the forward portion of the scriber illustrated in FIG. 1;

FIG. 3 is a top plan view of the diamond scriber illustrated in FIG. 2;

FIG. 4 is an isometric view of the diamond portion of the scriber illustrated in FIGS. 1 to 3, inclusive;

Figure 5:
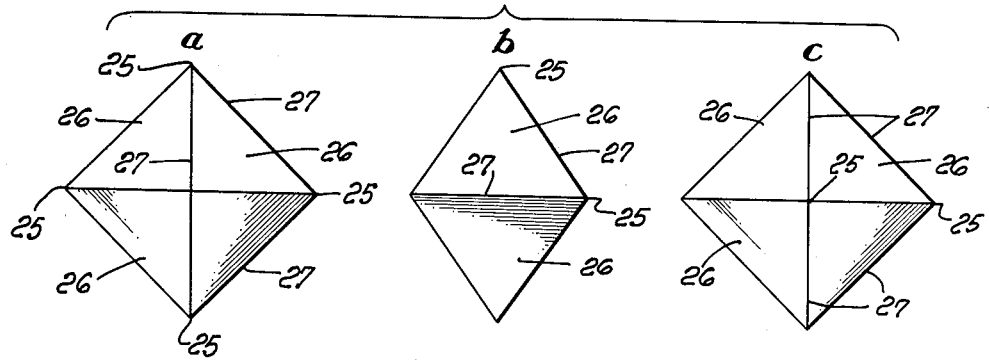
Figure 6:
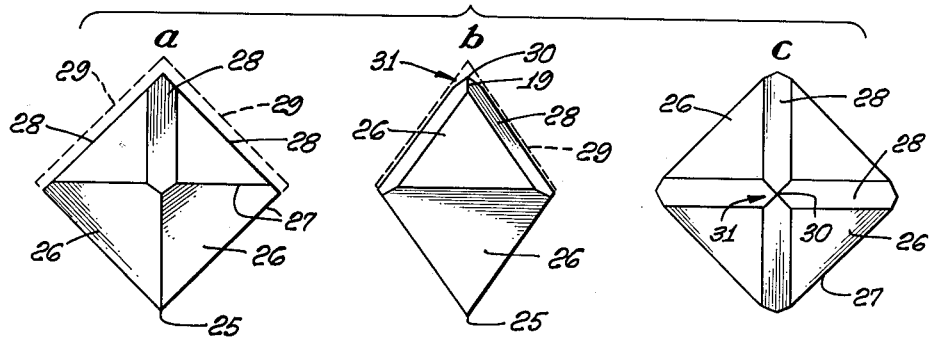
Figure 7:
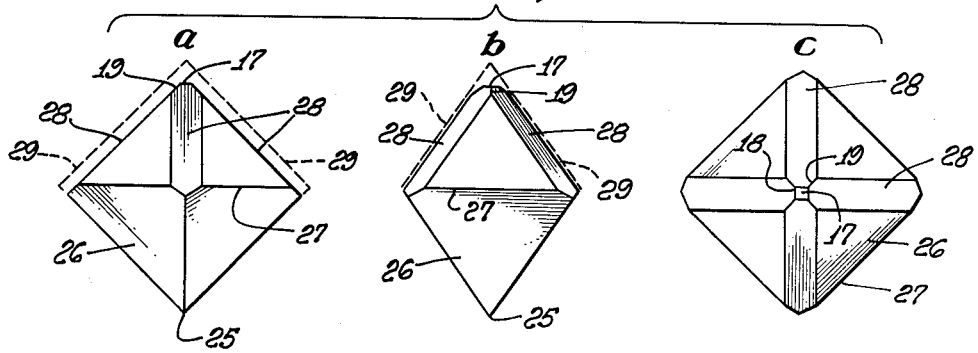

FIGS. 5–a, b and c are three views of a natural diamond of octahedron shape, "a" being a side elevational view, "b" a view like "a" turned 45 degrees from "a," and "c" being a top view of the diamond illustrated at "a";

FIGS. 6–a, b and c are views corresponding to FIGS. 5–a, b and c, respectively, disclosing the octahedron after four of its natural edges have been removed to provide flat regions or faces;

FIGS. 7–a, b and c are views corresponding to FIGS. 6–a, b and c, respectively, showing the shape of the diamond after the natural edges have been removed and the resulting point truncated.

The scriber device illustrated in the drawings includes a tool shank 10 having a tapered forward portion 11 provided with a central socket 12 in which any suitable matrix material 13 may be provided, in which a diamond 14 is embedded. The diamond is mounted centrally within the matrix in the socket and secured in place through known powdered metal techniques. As an example, the matrix 13 may be powdered tungsten carbide secured to the shank 10 of the tool and embracing the diamond 14 with a scribing portion 15 of the diamond projecting from the forward tapered portion 16 of the matrix.

The diamond 14 is of a suitable polyhedron shape, such as an octahedron, and has its forward pyramid portion 15 truncated to provide a flat end face 17 substantially normal to the axis of the tool shank 10. By truncating the pyramid, a plurality of scribing points 18 are provided, such as the four points illustrated. One of these points is used at a time in performing a scribing operation. As an example, the diamond scriber can be used for dicing silicon wafers in the manufacture of semi-conductors. When one point 18 has become dull, the tool shank 10 may be turned through 90 degrees to present another point to the work. When the second point has become dull, the tool can be turned an additional 90 degrees to present the next point to the work, and so forth. Accordingly, it is evident that a multiplicity of points has been provided, which will have a greater life than the single point heretofore used, which is usually one of the natural points of the diamond crystal itself. The points 18 provided by truncating the pyramid 15 have greater strength than the single point of a natural diamond, since the knife edges 19 at the intersecting sides 20 of the pyramid make a flatter angle with the truncated end face 17 of the diamond or stone. Accordingly, dulling or breaking off of each point 18 is less likely to occur, with the result that each point has a greater life than the single point at the apex of a nontruncated pyramid.

With the particular diamond illustrated, the points 18 have a much greater strength than if they lay within the normal lines of intersection of the sides of the octahedron. The point 25 of a natural octahedron or polyhedron is the softest portion in the diamond crystal; whereas, the crystal is much harder in the region of its triangular faces 26 (FIG. 5). In the present case, the four points 18 provided by truncating the pyramid 15 actually lie in the region of the faces 26 of the octahedron, rather than along the lines of intersection 27 of the faces.

As disclosed in FIG. 5, a diamond in the form of a natural octahedron is illustrated, having triangular side faces 26 which merge at the apices 25 of the octahedron. In producing the specifically shaped diamond 14 which is embedded in the matrix 13, as illustrated in FIGS. 1 to 4, inclusive, the edge portions of one-half of the diamond, such as the upper half of the diamond illustrated in FIG. 5, are ground away to provide the four tapered flat regions or faces 28 illustrated in FIGS. 6–a, b and c. The broken lines 29 in FIG. 6 represent the original or natural outline of the octahedron, whereas the solid lines represent the new outline resulting from grinding away the edge portions. At the upper end of the diamond, as shown in FIG. 6, the grinding of the edge portions results in four knife edges 19 inclined toward one another that merge in the point 30 of a pyramid 31, these knife edges lying generally in the central plane of each of the original faces 26 of the octahedron normal to its surface and extending through its original apex 25. Thus, a point 30 is formed in the diamond extending inwardly to some extent from the original point 25 of the diamond or stone. The knife edges 19 themselves now lie approximately 45 degrees from the original edges 27 of the polyhedron.

FIG. 7 illustrates the next step in the formation of the diamond cutting element illustrated in FIGS. 1 to 4, inclusive, and that includes the truncation of the pyramidal portion 31 of the diamond illustrated in FIG. 6 by grinding away the point 30 to provide the truncated end face 17 lying substantially normal to the axis of the stone or diamond 14. By truncating the point 30, the end face 17 forms, with the four knife edges 19, the four points 18 displaced about 90 degrees from one another. Each of these points 18 then lies in a central plane of each of the faces 26 of the original octahedron. As noted above, each of such face portions 26 is the hardest part of the natural diamond. Accordingly, the points 18 provided in the diamond are each at a much harder portion of the diamond 14 than the points 25 of the natural octahedron, which are the softest portion of the diamond crystal. Not only is each point 18 in a much harder portion of the diamond than the points 25 of the natural octahedron disclosed in FIG. 5, but the knife edges 19 make a flatter angle with the truncated face 17, resulting in each point 18 having much greater strength than heretofore provided, and therefore less susceptible to breaking off. Accordingly, the life of each point 18 is considerably enhanced.

As shown most clearly in FIG. 2, the diamond 14 shown in FIG. 7 is embedded in the matrix 13 by orienting the diamond crystal with its unground edge portions 27 inwardly and the ground portions 28 outwardly. The truncated pyramid part 15 of the diamond crystal projects outwardly beyond the matrix 13, so that the knife edges 19 and the four points 18 are all exposed and can be readily applied to the work on which the scribing function is to be performed.

I claim:

1. In a scriber: a shank; a diamond of polyhedron shape secured to said shank and having edge portions removed to provide flat faces meeting each other at a forward pyramid portion, the sides of the forward pyramid portion intersecting each other at lines lying at a substantial angle to the natural meeting edges of the diamond faces, said pyramid portion having a truncated forward face forming a plurality of spaced scribing points with the lines of intersection of the sides of said pyramid portion.

2. In a scriber: a shank; a diamond of octahedron shape secured to said shank and having edge portions removed to provide flat faces meeting each other at a forward pyramid portion, the sides of the forward pyramid portion, intersecting each other at lines lying at a substantial angle to the natural edges of the octahedron, said pyramid portion having a truncated forward face forming four spaced scribing points with the lines of intersection of the sides of said pyramid portion.

3. In a scriber: a shank; a diamond of polyhedron shape secured to said shank and having edge portions removed to provide flat faces meeting each other at a forward pyramid portion, the sides of the forward pyramid portion intersecting each other at lines lying at a substantial angle to the natural meeting edges of the diamond faces, said pyramid portion having a truncated forward face normal to the axis of the diamond running through its opposed apices and forming a plurality of spaced scribing points with the lines of intersection of the sides of said pyramid portion.

4. In a scriber: a shank; a diamond of octahedron shape secured to said shank and having edge portions removed to provide flat faces meeting each other at a forward pyramid portion, the sides of the forward pyramid portion intersecting each other at lines lying at a substantial angle to the natural edges of the octahedron, said pyramid portion having a truncated face normal to the axis of the diamond running through its opposed apices and forming four spaced scribing points with the lines of intersection of the sides of said pyramid portion.

5. In a scriber: a shank; a diamond of polyhedron shape secured to said shank and having edge portions removed to provide flat faces meeting each other at a forward pyramidal portion, the sides of the forward pyramidal portion intersecting each other at lines lying at a substantial angle to the natural meeting edges of the diamond faces, each of said lines lying in the central plane of a natural face of the original diamond of polyhedron shape, said pyramid portion having a truncated forward face forming a plurality of spaced scribing points with the lines of intersection of the sides of said pyramid portion, each of said scribing points lying in said central plane.

6. In a scriber: a shank; a diamond of octahedron shape secured to said shank and having edge portions removed to provide flat faces meeting each other at a forward pyramid portion, the sides of the forward pyramid portion intersecting each other at lines lying at a substantial angle to the natural edges of the octahedron, each of said lines lying in the central plane of a natural face of the diamond of octahedron shape, said pyramid portion having a truncated forward face forming four spaced scribing points with the lines of intersection of the sides of said pyramid portion, each of said scribing points lying in said central plane.

7. In a scriber: a shank; a diamond of octahedron shape secured to said shank and having edge portions removed to provide flat faces meeting each other at a forward pyramid portion, the sides of the forward pyramid portion intersecting each other at lines each of which is disposed at an angle of about 45 degrees to the natural edges of the octahedron, each of said lines lying in the central plane of a natural face of the original diamond of octahedron shape, said pyramid portion having a truncated forward face forming four spaced scribing points with the lines of intersection of the sides of said pyramid portion, each of said scribing points lying in said central plane.

References Cited in the file of this patent
UNITED STATES PATENTS
2,367,857   Findlater _____ Jan. 23, 1945
OTHER REFERENCES Publication: Industrial Diamond Device, February 1960, vol. 20, pages 31–37 (only page 35 is required), "The Influence of the Crystallographic Orientation on the Wear of Truing Diamonds," by G. Pahditzsch.